United States Patent [19]

Denton

[11] 4,183,667
[45] Jan. 15, 1980

[54] LIGHT-RAY INDICATOR

[76] Inventor: Howard M. Denton, 1338 N. Jim Miller Rd., Dallas, Tex. 75217

[21] Appl. No.: 835,444

[22] Filed: Sep. 21, 1977

[51] Int. Cl.² .............................................. G01C 5/02
[52] U.S. Cl. .................................... 356/250; 356/149
[58] Field of Search .................... 356/149, 250; 339/7; 174/86; 64/18; 74/5.6 D; 248/181, 184

[56] References Cited

U.S. PATENT DOCUMENTS

| | | | |
|---|---|---|---|
| 2,423,270 | 7/1947 | Summers, Jr. | 74/5.6 D X |
| 2,595,951 | 5/1952 | Konet et al. | 74/5.6 D X |
| 3,471,234 | 10/1969 | Studebaker | 356/250 X |
| 3,729,266 | 4/1973 | Mason et al. | 356/250 |
| 3,858,984 | 1/1975 | Denton et al. | 356/250 |

Primary Examiner—John K. Corbin
Assistant Examiner—Matthew W. Koren
Attorney, Agent, or Firm—Clarence A. O'Brien; Harvey B. Jacobson

[57] ABSTRACT

A light-ray indicator having a support on which is mounted by a universal joint a housing containing a radiation source and provided with a weight at the lower end so as to seek a plumb line. The universal joint forms a portion of an electrical circuit which connects the radiation source contained in the housing a power supply mounted on the support mounted externally of the housing and universal joint, with an adaptor unit including an adjustable mirror being mounted on an upper end of the housing so as to permit the mirror to deflect a radiation beam received from the radiation source through an angle variable with respect, but intersecting, an axis along which the beam is originally emitted from the radiation source.

5 Claims, 8 Drawing Figures

LIGHT-RAY INDICATOR

BACKGROUND OF THE INVENTION

1. Field of the Invention

This invention relates generally to a light-ray indicator, and particularly to apparatus for automatically indicating a point perpendicular to or horizontally from a predetermined point.

2. Description of the Prior Art

It is known to project a light beam aligned along a plumb line for transferring markings from one point to another on the plumb line. Devices employing this concept, an example of which can be found in U.S. Pat. No. 3,858,984, issued Jan. 7, 1975, to H. M. Denton, et al., usually have a lamp mounted on a support by a universal joint, and a weight functioning as a plumb bob attached to the lamp for aligning same along a plumb line. U.S. Pat. No. 3,858,984 also shows an adaptor unit which permits the light beam to be projected horizontally for performing surveying and similar functions.

It also is generally known to provide transits with laser beam projecting devices, examples of which can be found in U.S. Pat. Nos. 3,469,919, issued Sept. 30, 1969, to F. L. Zellner, and 3,471,234, issued Oct. 7, 1969, to R. H. Studebaker, while U.S. Pat. No. 3,635,565, issued Jan. 18, 1972, to G. P. Colson, discloses a laser vertical collimator which establishes a plumb reference line for use in construction of buildings or shafts.

A fundamental problem encountered with employing a laser beam as the light source in a light-ray indicator is that laser emitting sources require amounts of power far in excess than that which can be contained in a housing universally mounted on a support in the manner disclosed in the aforementioned U.S. Pat. No. 3,858,984. Accordingly, it is necessary to connect the laser tube or other suitable laser source contained within the universally mounted housing with a power supply located externally of the housing and its associated universal mounting.

SUMMARY OF THE INVENTION

It is an object of the present invention to provide a light-ray indicator suitable for use with a laser beam generator.

It is another object of the present invention to provide a universal joint capable of forming a part of an electrical circuit.

It is yet another object of the present invention to provide an adaptor unit for light-ray indicator which permits a beam emitted from the indicator to be deflected through an angle intersecting the emitted beam, but variable through a predetermined angle for increasing the versatility of the indicator.

These and other objects are achieved by providing a light-ray indicator having: a support; a housing; a mounting arrangement attached to the support for movably supporting the housing on the support; and a radiating assembly including a radiation source arranged within the housing for emitting a radiation beam from the housing, with the source being a laser tube electrically connected through the mounting arrangement to a power supply disposed on the support externally of both the housing and the mounting arrangement.

The mounting arrangement preferably includes a universal joint universally mounting the housing on the support, and electrical conductors partially formed by elements of the universal joint for forming an electrical circuit connecting the radiation source contained in the housing to an associated power supply disposed on the support externally of the housing and the universal joint.

The universal joint itself advantageously includes a ring disposed surrounding the housing; a first bearing assembly disposed for pivotally mounting the housing on the ring; and a second bearing assembly disposed perpendicularly to the first bearing assembly and arranged for pivotally mounting the ring on the support. Each of the bearing assemblies includes a pair of longitudinal rods extending in opposite directions cantilever fashion from the housing and ring, respectively, and a pair of elements mounted on opposite portions of the ring and support, respectively, and arranged for receiving associated ones of the rods, with the latter rotatably resting on the elements. By constructing the rods and elements of the bearing assemblies from an electrically conductive material, and connecting to the rods of the first bearing assembly and the elements of the second bearing assembly appropriate electrical conductors, such as wires, an electrical circuit is formed which electrically connects a laser tube or other suitable radiation source to a power supply.

The support advantageously includes a tripod stand comprising a platform and three legs diverging from a common face of the platform. The latter has the shape of an associated triangle in plan, with the legs being disposed at vertices of the triangle for receiving part of the power supply for the radiation source. The platform is also provided with an opening receiving the housing and universal joint.

An adaptor unit according to the invention for use with a light-ray indicator includes a cup-shaped casing rotatably arrangeable in inverted orientation on an upper end of the housing of the indicator, and contains a mirror assembly arranged in the casing in the path of the radiation beam being emitted by the radiation source of the indicator for reflecting the beam from the longitudinal axis of the housing and into a plane intersecting the axis of the housing. The casing is advantageously provided with a longitudinally extending slit, with the mirror being mounted for pivotal movement through a predetermined angle, such as 90 degrees, in order to vary the angle through which the beam emitted from the radiation source is deflected.

These together with other objects and advantages which will become subsequently apparent reside in the details of construction and operation as more fully hereinafter described and claimed, reference being had to the accompanying drawings forming a part thereof, wherein like numerals refer to like parts throughout.

DESCRIPTION OF THE PREFERRED EMBODIMENTS

Figure 1:
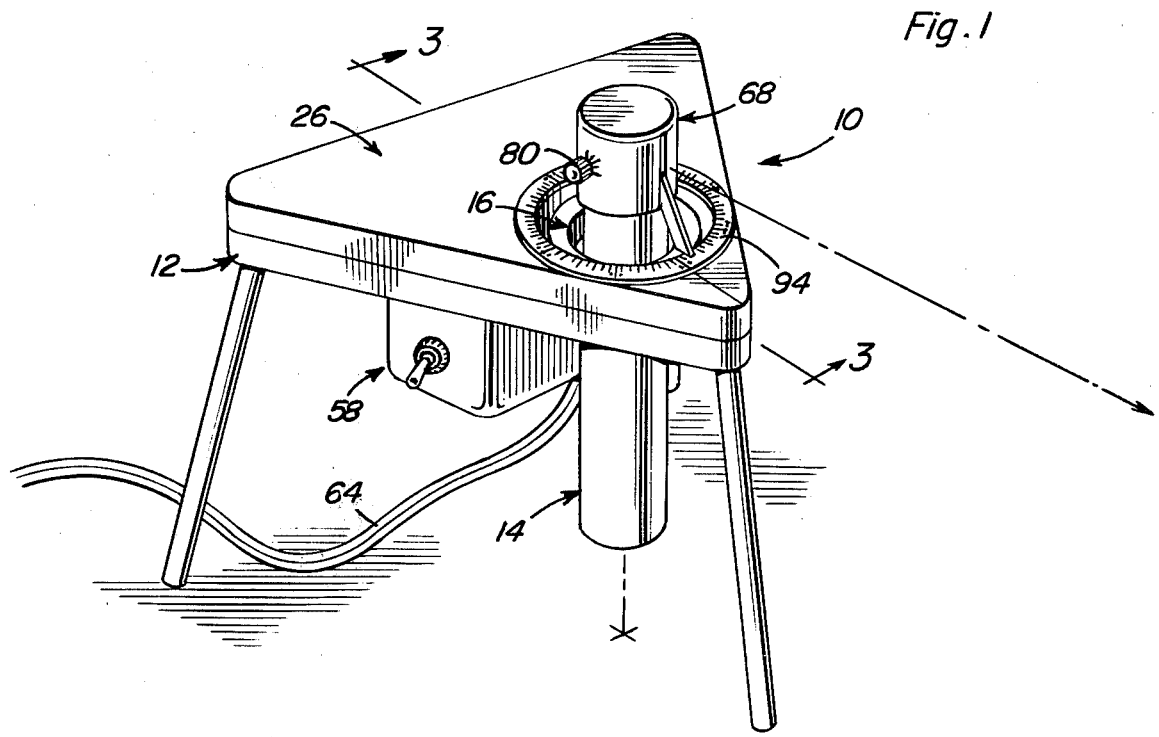
FIG. 1 is a perspective view showing a light-ray indicator according to the present invention.
Figure 2:
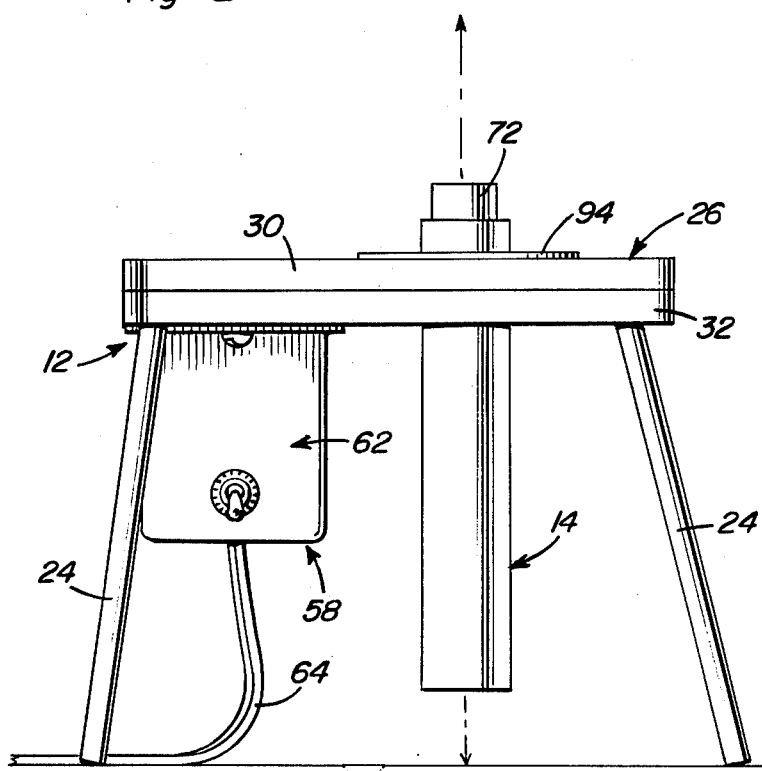
FIG. 2 is an enlarged, side elevational view, showing the light-ray indicator of FIG. 1, but with the light-ray deflecting adaptor unit removed.

Referring now more particularly to FIGS. 1 through 4 of the drawings, a light-ray indicator 10 according to the present invention includes a support 12, a longitudinally extending, generally cylindrical housing 14, and a mounting arrangement 16 attached to support 12 for movably supporting housing 14 on support 12. Indicator 10 also includes a radiation assembly 18 formed in part by a radiation source 20 arranged within housing 14 for emitting a radiation beam in at least one direction from an associated open end of housing 14.

The mounting arrangement 16 includes a universal joint 22 which universally mounts housing 14 on support 12, and a conductor arrangement which forms an electrical circuit connecting radiation source 20 to a power supply disposed on support 12 externally of both housing 14 and its associated universal joint 22.

The support 12 includes a tripod stand comprising three legs 24 arranged diverging from a common, specifically lower surface of a platform 26 which in plan can be, as illustrated, in the shape of an isosceles triangle. The legs 24 are disposed at vertices of the triangle, with platform 26 also being provided adjacent one of the vertices with an opening 28 arranged for receiving housing 14 and universal joint 22. Platform 26 is advantageously formed as illustrated from two coplanar sections 30 and 32 each triangular in plan, and each provided in addition to a hole partially forming opening 28 with a recess 34, 36 mating with the recess 36, 34 of the other section 32, 30 for forming a void within platform 26. The radiation assembly 18 includes in addition to radiation source 20 a power supply partially disposed within the void formed by recesses 34 and 36.

The universal joint 22 includes a ring 38 disposed surrounding, but slightly spaced from, housing 14. A first bearing assembly 40 pivotally mounts housing 14 on rings 38, while a second bearing assembly 42 disposed perpendicularly to assembly 40 pivotally mounts ring 38 on portions of support 12 immediately adjacent to and partially defining opening 28.

Figure 5:
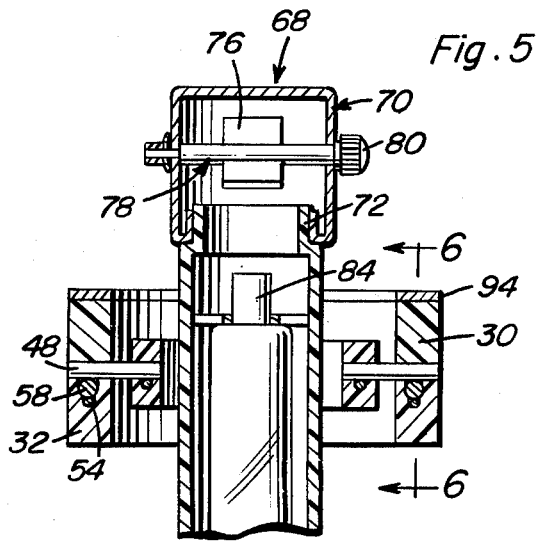
FIG. 5 is a fragementary, sectional view taken generally along the line 5—5 of FIG. 3.
Figure 6:
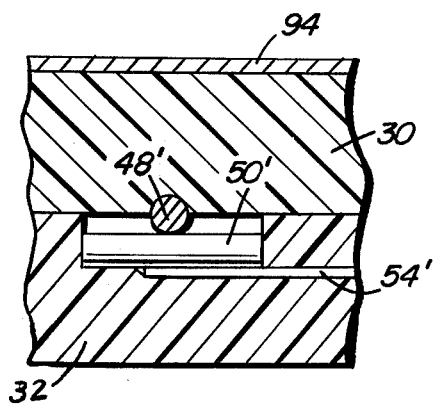
FIG. 6 is an enlarged, fragmentary, sectional view taken generally along the line 6—6 of FIG. 5.
Figure 4:
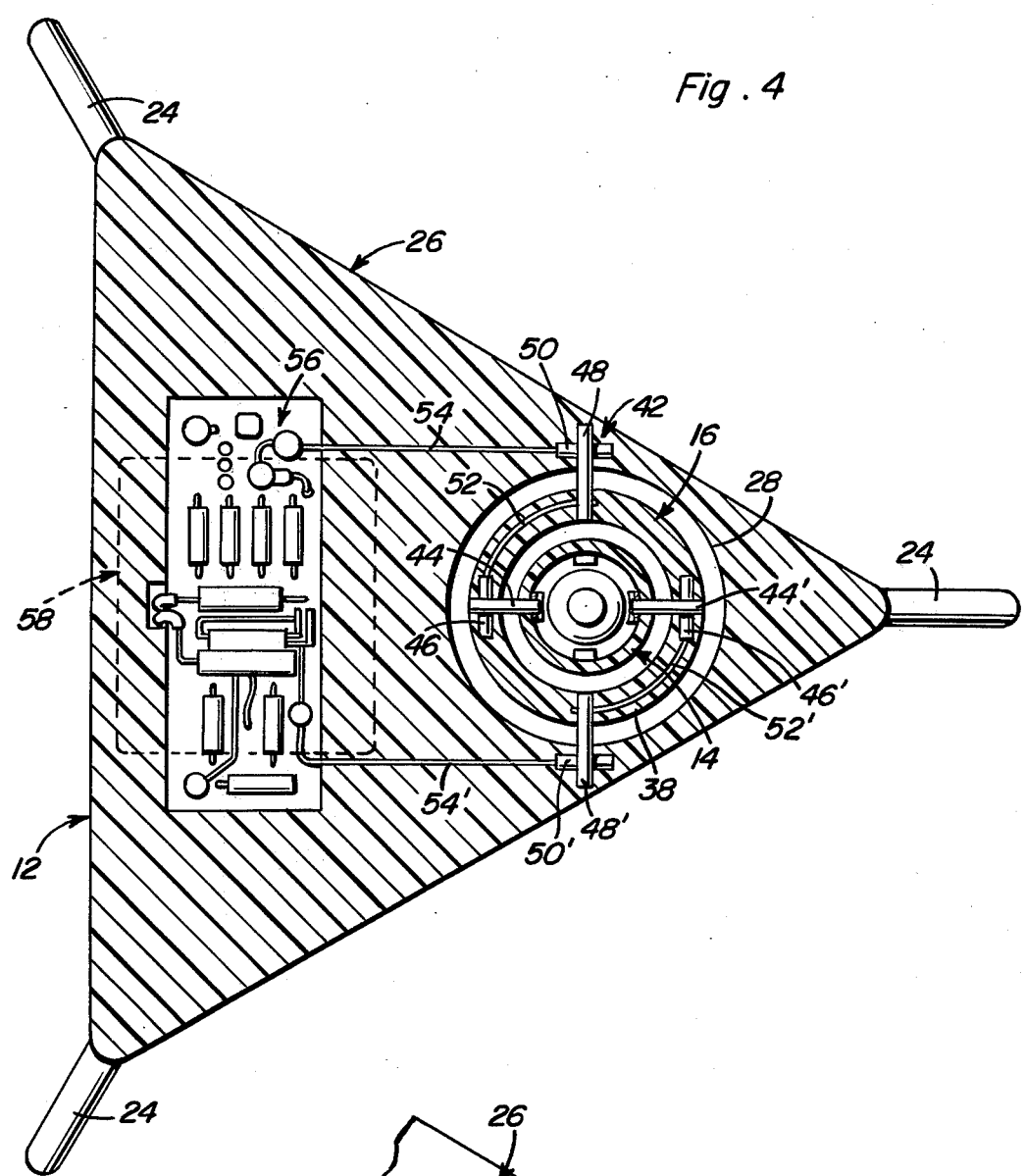
FIG. 4 is a sectional view taken generally along the line 4—4 of FIG. 3.

Referring now more particularly to FIGS. 5 and 6 of the drawings, bearing assembly 40 includes a pair of longitudinal rods 44 and 44' extending in opposite directions cantilever fashion from housing 14, and a pair of elements 46 and 46' mounted on opposite peripheral portions of ring 38 and arranged for receiving rods 44 and 44', respectively. The rods 44, 44' are disposed so as to rotatably rest on their associated elements 46, 46'. In a similar manner, bearing assembly 42 includes longitudinal rods 48 and 48' extending cantilever fashion from ring 38, and also from housing 14, in opposite directions perpendicular with respect to the rods 44 and 44'. Elements 50 and 50' are mounted on respective portions of platform 26 which partially form opening 28 and are arranged for rotatably receiving associated elements 50 and 50'. By this arrangement, it will be appreciated that housing 14 can pivot in one direction about rods 44, 44', and in the perpendicular direction about the rods 48, 48', so as to achieve a universal movement.

Rods 44, 44' and 48, 48', elements 46, 46' and 50, 50' are all constructed from an electrically conductive material, such as copper, bronze, and aluminium, with the rods 44, 44' being electrically connected to the radiation source 20, the elements 46, 46' being connected to the rods 48, 48', respectively, as by wires or other suitable conductors 52 and 52', and the elements 50 and 50' being connected to a source of electricity as by wires or other suitable conductors designated 54 and 54'. More specifically, the conductors 54, 54' are connected to a circuit board 56 of conventional construction and which partially forms a power supply 58 also including a conventional transformer 60 suspended from the bottom surface of section 32 beneath the platform 26 and enclosed by a suitable cover 62. Board 56 is disposed in the cavity formed by recesses 34, 36. A line cord 64 extending from transformer 60 permits connection of power supply 58 to a suitable electrical outlet (not shown), and the like, in a conventional manner so as to provide indicator 10 with electrical power.

The lower end of housing 14 is provided with an annular weight 66 which may be retained in housing 14 as by the illustrated screw threads, for forming a plumb bob which will cause housing 14 to move about universal joint 22 and assume a plumb line along the longitudinal axis of the cylindrical housing 14.

Figure 7:
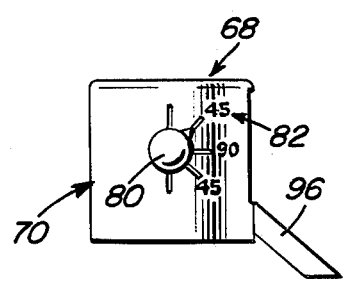
FIG. 7 is a side elevational view showing an adaptor unit according to the present invention, and as seen in FIGS. 1, 3, and 5.
Figure 3:
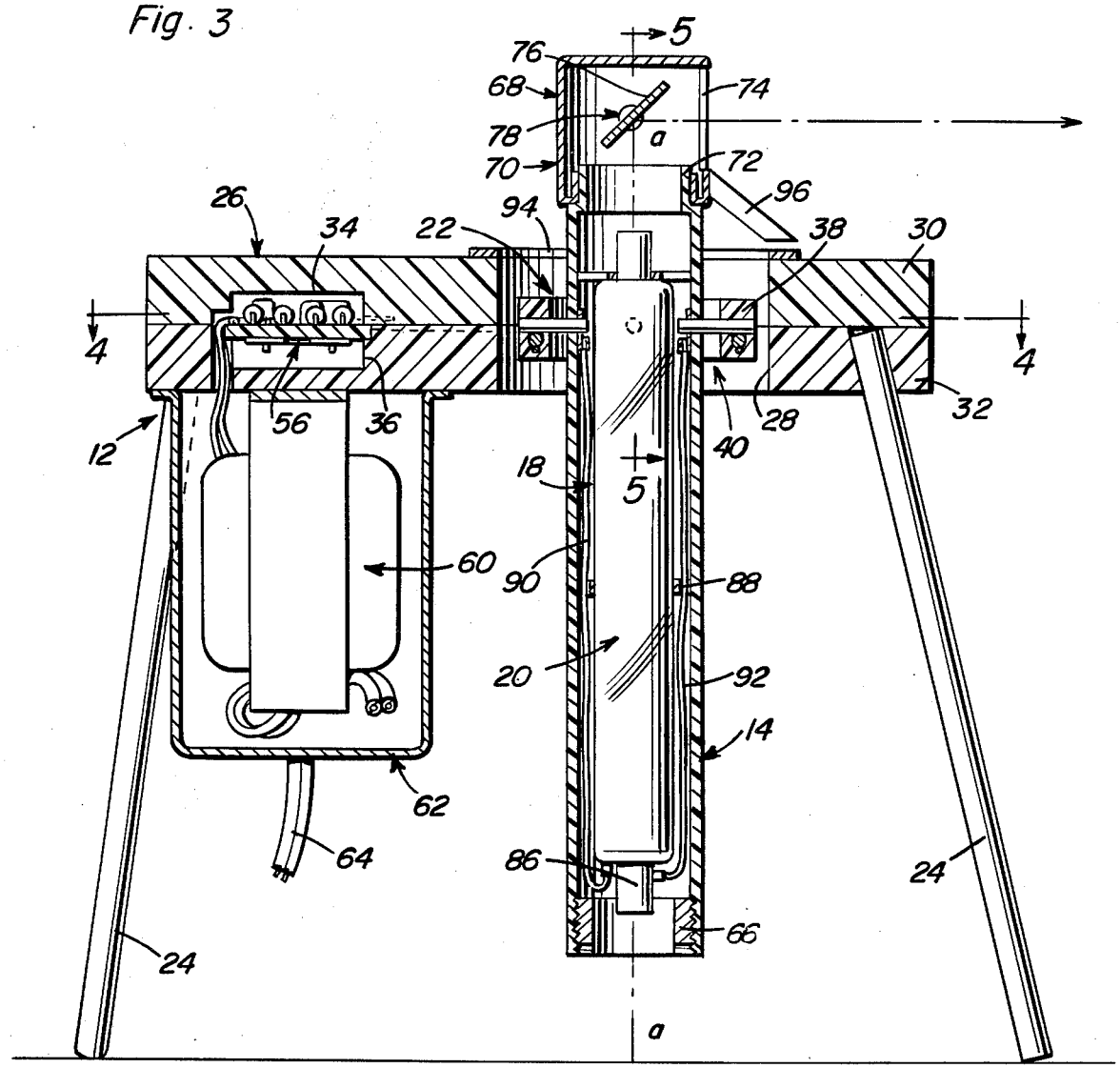
FIG. 3 is an enlarged, vertical sectional view taken generally along the line 3—3 of FIG. 1.

Adaptor unit 68 for use with a light-ray indicator 10 including a radiation source 20 arranged for emitting a radiation beam along a plumb line, and the like, includes a cup-shaped casing 70 rotatably arrangeable in inverted orientation on a neck portion 72 forming the upper end of housing 14. Provided in the cylindrical wall of casing 70 is a slit-like aperture 74 extending longitudinally substantially parallel to the longitudinal axis of the housing. A substantially planar mirror 76 is affixed to a shaft 78 disposed substantially perpendicularly to aperture 74 and arranged extending through the cylindrical wall of casing 70 for rotation with respect thereto. As can be seen FIG. 7, indicia is advantageously provided on the outer surface of casing 70 to indicate the angle at which mirror 76 is disposed. For example, as shown in FIG. 3, when the mirror is set at 90 degrees by the pointer of knob 80, the plane of mirror 76 will be essentially 45 degrees with respect to the axis a—a along which radiation source 20 is disposed, and thus the beam emitted by source 20 will be deflected substantially 90 degrees. The angle of deflection of the beam passing through the vertically extending aperture 74 can be varied by adjustment of mirror 76 so as to permit indicator 10 to be used in determining points horizontally spaced from radiation source 20 at angles other than horizontal from the pivot axis of shaft 78 which supports mirror 76.

Radiation source 20 advantageously is a conventional laser tube which emits a laser beam in opposite co-axial directions from its longitudinal spaced ends 84 and 86. A suitable clamping ring 88 retains the laser tube within housing 14, while wires 90 and 92 connect the laser tube to the rods 44 and 44'.

Figure 8:
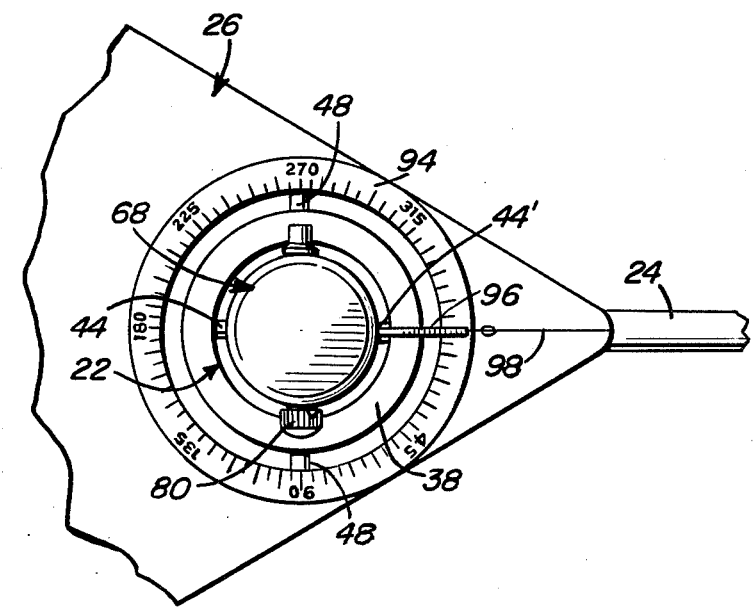
FIG. 8 is an enlarged, fragmentary, top plan view showing the right foreground portion of the light-ray indicator seen in FIG. 1.

As can best be seen in FIG. 8, an annular plate 94 is disposed on the upper surface of section 30 of platform 26 so as to be concentric with the center point of universal joint 20, and therefore concentric with the center of the pivot plane of housing 14, and is calibrated in 360 degrees so as to form a protractor which can cooperate with a projection 96 provided on casing 70 to easily determine the angle of aperture 74 relative to a reference line 98 provided on the upper surface of section 30 of platform 26.

In operation, as can be appreciated from the above description and from the drawings, electrical energy will be fed through the power supply 58 by turning the illustrated toggle switch, for example, to its on position, and the electrical energy will pass through the universal joint 22 and into the laser tube which forms radiation source 20 so as to cause a radiation beam to be emitted coaxially of the longitudinal extent of housing 14. When it is desired to employ adaptor unit 68, same may be readily adjusted by placing projection 96 to the proper reading on the annular plate 94, assuming that the reference line 98 has been initially positioned as desired, and mirror 76 can be appropriately positioned by adjustment of knob 80 to deflect the upwardly directed portion of the beam emitted by the laser tube at the angle desired. It will be appreciated that the downwardly directed portion of the laser beam will strike the supporting surface S at a point provided on the supporting surface S which is to be used as a reference point. Thus set up, an indicator 10 according to the present invention can be used in a simple yet reliable manner for determining various relationships which must be determined during construction of various structures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A light-ray indicator comprises, in combination:
 a support;
 a housing;
 mounting means including a universal joint comprising in combination; a ring disposed surrounding the housing, but spaced therefrom; first bearing means including a pair of longitudinal rods extending in opposite directions cantilever fashion from the housing, and a pair of elements mounted on opposite portions of the ring and arranged for receiving the rods, the latter rotatably resting on the elements; second bearing means disposed perpendicularly to the first bearing means and including a further pair of longitudinal rods extending cantilever fashion from the ring, and from the housing, in opposite directions perpendicular with respect to the longitudinal rods of the first bearing means, and further elements mounted on the support and arranged for receiving the further rods, the latter rotatably resting on the further elements;
 radiating means including a radiation source arranged within the housing for emitting a radiation beam from the housing; and
 conductor means for electrically connecting the radiation source to a power supply disposed on the support, the conductor means including, in combination:
 the first and second bearing means; and
 electrical conductors electrically connecting together one of each pair of elements and further rods to form a pair of sets of elements and further rods, the rods, further rods, elements, and further elements being constructed from an electrically conductive material, with the rods being electrically connected to the radiation source and the further elements electrically connected to a source of electricity, with the housing being a cylinder disposed having an upper end and a lower end, with an annular weight being mounted on the lower end of the cylinder for orienting the cylinder along a plumb line.

2. A structure as defined in claim 1, wherein the housing is a hollow cylinder having a longitudinal axis and vertically disposed on the support and arranged for directing the radiation beam upwardly and out of the housing through an upper end of the housing, the housing having a lower end, a weight disposed at the lower end of the housing for causing the housing to orient along a plumb line, and further including an adaptor unit, comprising, in combination:
 a cup-shaped casing rotatably arranged in inverted orientation on the upper end of the housing; and
 mirror means arranged in the casing in the path of the upwardly directed radiation beam for reflecting same from the longitudinal axis of the housing and into a plane intersecting the axis of the housing, the casing being provided with an aperture through which the reflected beam can pass from the casing.

3. A structure as defined in claim 2, wherein the platform has an upwardly facing structure, and indicia forming a protractor being provided on the platform and surrounding the opening in the platform, with the casing of the adaptor unit including a projection forming a pointer cooperating with the indicia to give an angular reading of the direction of the aperture.

4. A structure as defined in claim 2, wherein the mirror means includes a planar mirror pivotally mounted on the casing for varying an angle of reflection of the radiating beam, with the aperture being a slit extending longitudinally parallel to the longitudinal axis of the housing.

5. A light-ray indicator comprising in combination:
 a support including a tripod stand comprising a platform and three legs diverging from a common surface of the platform, the latter having in plan the shape of an isosceles triangle, and the legs being disposed at vertices of the triangle, with the platform having an opening receiving the housing, the platform including two superimposed sections each triangular in plan, each section provided with a recess mating with the recess of the other section for forming a void within the platform;
 a housing;
 mounting means attached to the support for removably supporting the housing on the support; and
 radiating means including a radiation source arranged within the housing for emitting a radiation beam from the housing, and further including a power supply partly disposed within the void formed within the platform.

* * * * *